(12) United States Patent
Suciu et al.

(10) Patent No.: US 7,927,075 B2
(45) Date of Patent: *Apr. 19, 2011

(54) FAN-TURBINE ROTOR ASSEMBLY FOR A TIP TURBINE ENGINE

(75) Inventors: Gabriel L. Suciu, Glastonbury, CT (US); James W. Norris, Lebanon, CT (US); Craig A. Nordeen, Manchester, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 938 days.

This patent is subject to a terminal disclaimer.

(21) Appl. No.: 11/719,757

(22) PCT Filed: Dec. 1, 2004

(86) PCT No.: PCT/US2004/040168
§ 371 (c)(1),
(2), (4) Date: May 21, 2007

(87) PCT Pub. No.: WO2006/060001
PCT Pub. Date: Jun. 8, 2006

(65) Prior Publication Data
US 2009/0148297 A1    Jun. 11, 2009

(51) Int. Cl.
*F01D 5/30* (2006.01)
*F01D 5/14* (2006.01)
*B23P 15/04* (2006.01)

(52) U.S. Cl. .................... 416/175; 416/198 A; 416/203

(58) Field of Classification Search ................ 416/175, 416/189, 192, 200 R, 198 A, 228, 203; 415/143, 415/199.4, 199.5
See application file for complete search history.

(56) References Cited

U.S. PATENT DOCUMENTS

| | | | |
|---|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |

(Continued)

FOREIGN PATENT DOCUMENTS
DE    767704    5/1953
(Continued)

OTHER PUBLICATIONS

EP Office Action, EP Application No. 04 822 137.8-2315, mailed Nov. 20, 2009.

*Primary Examiner* — Ninh H Nguyen
*Assistant Examiner* — Jesse Prager
(74) *Attorney, Agent, or Firm* — Carlson Gaskey & Olds PC

(57) ABSTRACT

A fan-turbine rotor assembly (24) for a tip turbine engine (10) includes a fan hub (64) with an outer periphery (112) scalloped by a multitude of elongated openings (114) which extend into a fan hub web (115). Each elongated opening defines an inducer receipt section (117) to receive an inducer section (66) and a hollow fan blade section (72). An inducer exhaust from each inducer section is located adjacent a core airflow passage (80) within each fan blade section to provide communication therebetween.

10 Claims, 5 Drawing Sheets

U.S. PATENT DOCUMENTS

| | | | |
|---|---|---|---|
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,588,277 A * | 6/1971 | Howald | 416/96 R |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |
| 2009/0169385 A1 * | 7/2009 | Suciu et al. | 416/179 |

FOREIGN PATENT DOCUMENTS

| | | |
|---|---|---|
| DE | 765809 | 11/1954 |
| DE | 1301634 | 8/1969 |
| DE | 2361310 | 6/1975 |
| DE | 3333437 | 4/1985 |
| DE | 19929987 | 1/2001 |
| EP | 0661413 | 7/1995 |
| EP | 1050682 | 11/2000 |
| FR | 1033849 | 7/1953 |
| FR | 2566835 | 1/1986 |
| GB | 766728 | 1/1957 |
| GB | 958842 | 5/1964 |
| GB | 1046272 | 10/1966 |
| GB | 1287223 | 8/1972 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059980 | 6/2006 |
| WO | 2006059990 | 6/2006 |
| WO | 2006059996 | 6/2006 |
| WO | 2006060001 | 6/2006 |
| WO | 2006060005 | 6/2006 |
| WO | 2006060009 | 6/2006 |
| WO | 2006060012 | 6/2006 |
| WO | 2006059997 | 11/2006 |
| WO | 2006060003 | 3/2007 |

* cited by examiner

FAN-TURBINE ROTOR ASSEMBLY FOR A TIP TURBINE ENGINE

BACKGROUND OF THE INVENTION

The present invention relates to a tip turbine engine, and more particularly to a fan-turbine rotor assembly which provides mechanical retention between a multitude of rotational components.

An aircraft gas turbine engine of the conventional turbofan type generally includes a forward bypass fan a compressor, a combustor, and an aft turbine all located along a common longitudinal axis. A compressor and a turbine of the engine are interconnected by a shaft. The compressor is rotatably driven to compress air entering the combustor to a relatively high pressure. This pressurized air is then mixed with fuel in a combustor and ignited to form a high energy gas stream. The gas stream flows axially aft to rotatably drive the turbine which rotatably drives the compressor through the shaft. The gas stream is also responsible for rotating the bypass fan. In some instances, there are multiple shafts or spools. In such instances, there is a separate turbine connected to a separate corresponding compressor through each shaft. In most instances, the lowest pressure turbine will drive the bypass fan.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow bypass fan blades for rotation therewith as generally disclosed in U.S. Pat. application publication Nos.: 20030192303; 20030192304; and 20040025490.

The tip turbine engine provides a thrust to weight ratio equivalent to conventional turbofan engines of the same class within a package of significantly shorter length.

One significant rotational component of a tip turbine engine is the fan-turbine rotor assembly. The fan-turbine rotor assembly includes intricate components, which rotate at relatively high speeds to generate bypass airflow while communicating a core airflow through each of the multitude of hollow fan blades. A large percentage of the expense associated with a tip turbine engine is the manufacture of the fan-turbine rotor assembly.

Accordingly, it is desirable to provide an assembly arrangement for a fan-turbine rotor assembly, which is relatively inexpensive to manufacture yet provides a high degree of reliability.

SUMMARY OF THE INVENTION

The fan-turbine rotor assembly for a tip turbine engine according to the present invention includes a fan hub, which has an outer periphery scalloped by a multitude of elongated openings, which extend into a fan hub web. Each elongated opening defines an inducer receipt section to receive an inducer section and a blade receipt section to retain a hollow fan blade section. The blade receipt section retains each of the hollow fan blade sections adjacent each inducer section. An inner fan blade mount is located adjacent an inducer exhaust from each inducer section to engage the inducer hub with the fan hub and provide a core airflow communication path from the inducer passages within each inducer section into the core airflow passage within each fan blade section.

The inducer sections and fan blade sections are directionally mounted within the fan hub such that the forces exerted upon the fan-turbine rotor assembly during operation further lock the inducer sections and fan blade sections into the fan hub. That is, operational forces maintain the fan-turbine rotor assembly in an assembled condition rather than operating to disassemble the components.

The present invention therefore provides an assembly arrangement for a fan-turbine rotor assembly which is relatively inexpensive to manufacture yet provides a high degree of reliability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
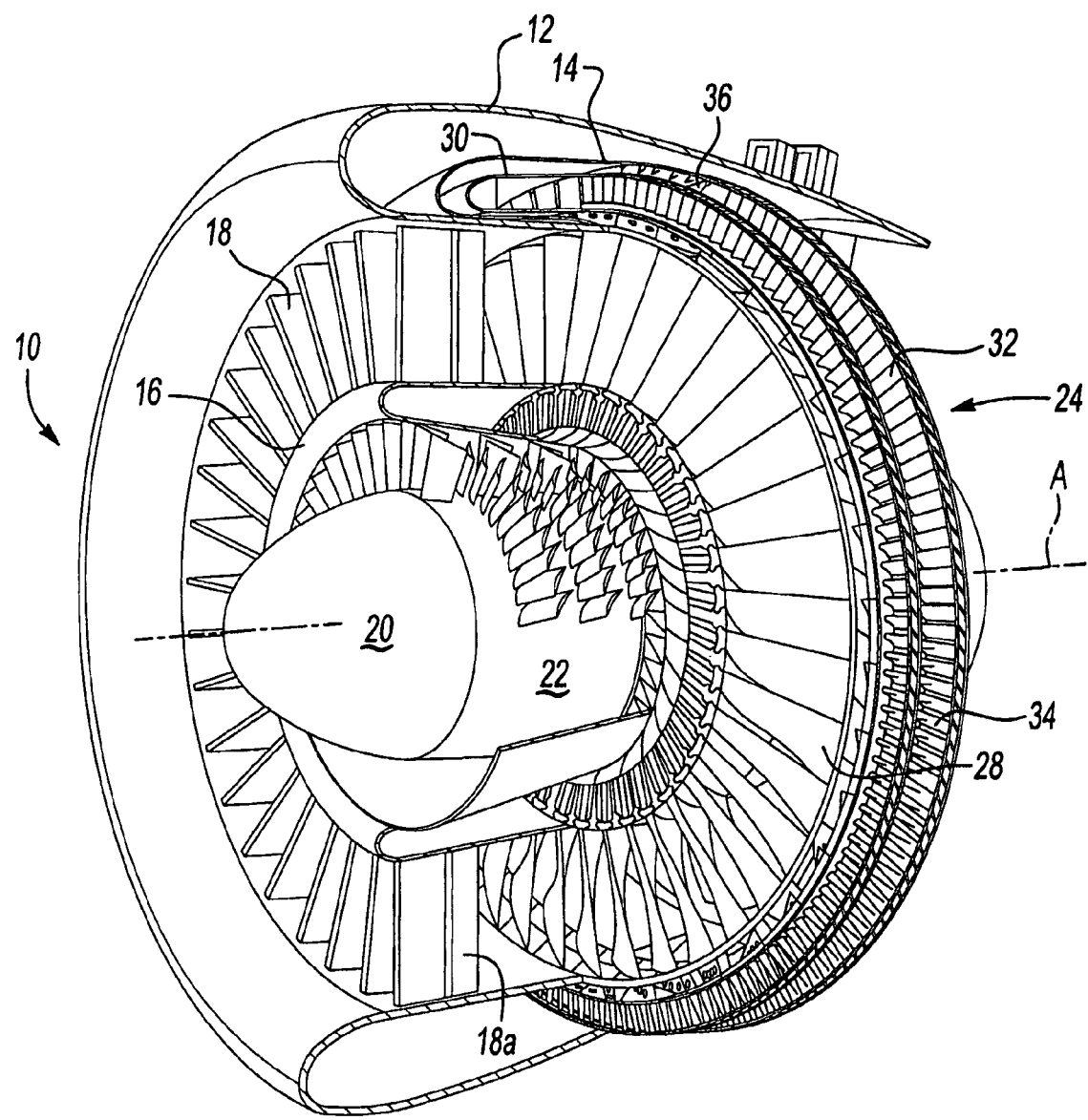
FIG. 1 is a partial sectional perspective view of a tip turbine engine.

FIG. 1 illustrates a general perspective partial sectional view of a tip turbine engine type gas turbine engine 10. The engine 10 includes an outer nacelle 12, a nonrotatable static outer support structure 14 and a nonrotatable static inner support structure 16. A multitude of fan inlet guide vanes 18 are mounted between the static outer support structure 14 and the static inner support structure 16. Each inlet guide vane preferably includes a variable trailing edge 18A.

A nose cone 20 is preferably located along the engine centerline A to smoothly direct airflow into an axial compressor 22 adjacent thereto. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multitude of hollow fan blades 28 to provide internal, centrifugal compression of the compressed airflow from the axial compressor 22 for distribution to an annular combustor 30 located within the nonrotatable static outer support structure 14.

A turbine 32 includes a multitude of tip turbine blades 34 (two stages shown) which rotatably drive the hollow fan blades 28 relative to a multitude of tip turbine stators 36 which extend radially inwardly from the static outer support structure 14. The annular combustor 30 is axially forward of the turbine 32 and communicates with the turbine 32.

Figure 2:
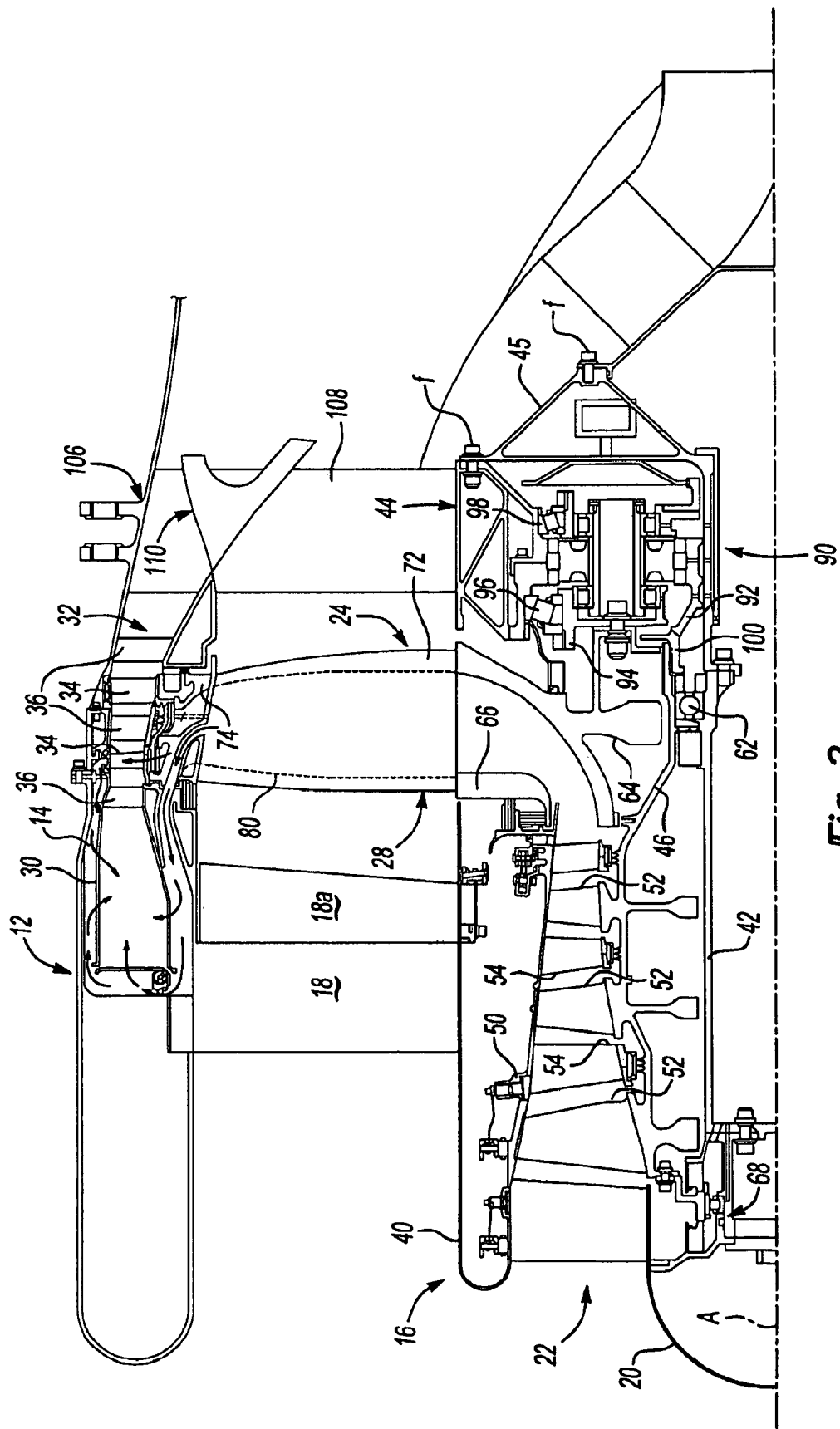
FIG. 2 is a longitudinal sectional view of a tip turbine engine along an engine centerline.

Referring to FIG. 2, the nonrotatable static inner support structure 16 includes a splitter 40, a static inner support housing 42 and an static outer support housing 44 located coaxial to said engine centerline A.

The axial compressor 22 includes the axial compressor rotor 46 from which a plurality of compressor blades 52 extend radially outwardly and a compressor case 50 fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multitude of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused toward an axial airflow direction toward the annular combustor 30. Preferably the airflow is diffused axially forward in the engine 10, however, the airflow may alternatively be communicated in another direction.

A gearbox assembly 90 aft of the fan-turbine rotor assembly 24 provides a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward bearing 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the core airflow passage 80 of the hollow fan blades 28 by rotation of the hollow fan blades 28. From the core airflow passage 80, the airflow is turned and diffused axially forward in the engine 10 into the annular combustor 30. The compressed core airflow. from the hollow fan blades 28 is mixed with fuel in the annular combustor 30 and ignited to form a high-energy gas stream. The high-energy gas stream is expanded over the multitude of tip turbine blades 34 mounted about the outer periphery of the fan blades 28 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multitude of exit guide vanes 108 are located between the static outer support housing 44 and the nonrotatable static outer support structure 14 to guide the combined airflow out of the engine 10 to provide forward thrust. An exhaust mixer 110 mixes the airflow from the turbine blades 34 with the bypass airflow through the fan blades 28.

Figure 4:
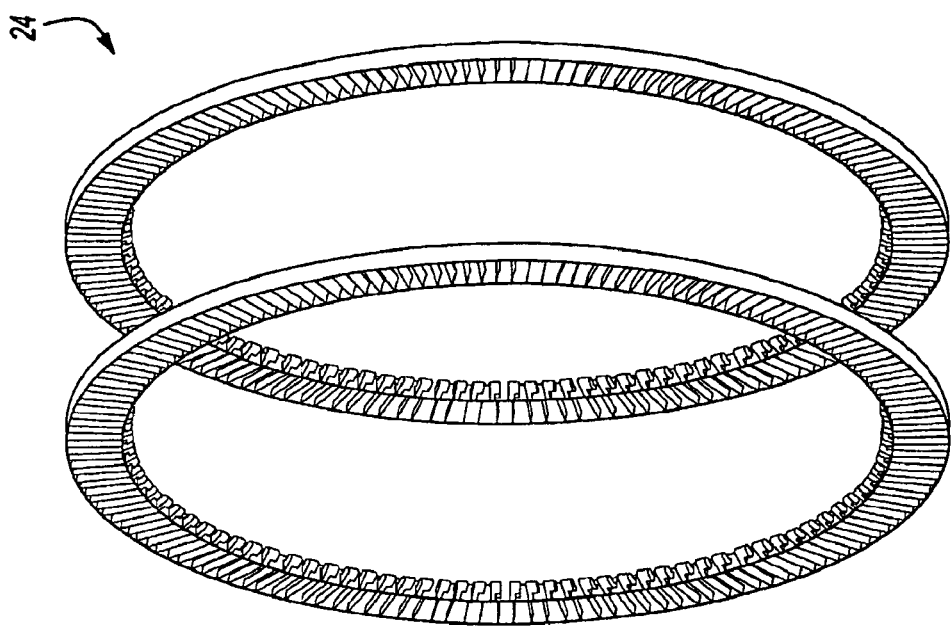
FIG. 4 is an assembled view of a fan-turbine rotor assembly.
Figure 3:
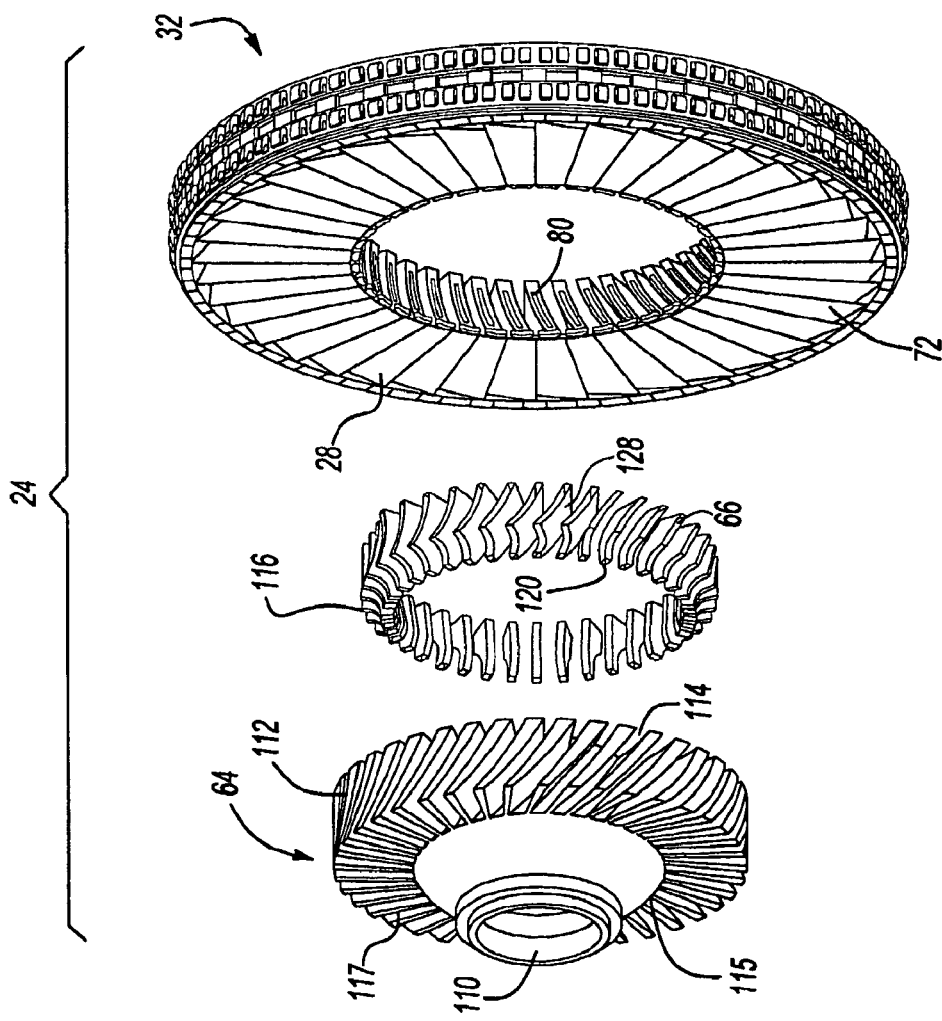
FIG. 3 is an exploded view of a fan-turbine rotor assembly.

Referring to FIG. 3, the fan-turbine rotor assembly 24 is illustrated in an exploded view. The fan hub 64 is the primary structural support of the fan-turbine rotor assembly 24 (FIG. 4). The fan hub 64 is preferably forged and then milled to provide the desired geometry. The fan hub 64 defines a bore 110 and an outer periphery 112. The outer periphery 112 is preferably scalloped by a multitude of elongated openings 114 located about the outer periphery 112. The elongated openings 114 extend into a fan hub web 115.

Each elongated opening 114 defines an inducer receipt section 117 to receive each inducer section 66. The inducer receipt section 117 generally follows the shape of the inducer section 66. That is, the inducer receipt section 117 receives the more complicated shape of the inducer section 66 without the necessity of milling the more complicated shape directly into the fan hub 64.

Figure 5:
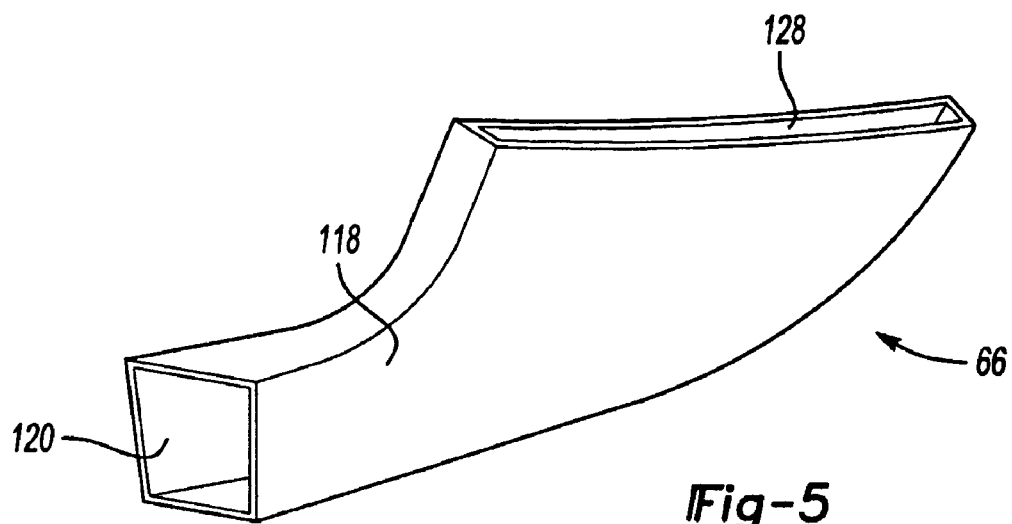
FIG. 5 is an expanded perspective view of an inducer section.

The inducer sections 66 are essentially conduits that define an inducer passage 118 between an inducer inlet 120 and an inducer exit 128 (also illustrated in FIG. 5). Preferably, the inducer sections 66 are formed of a composite material.

Figure 6:
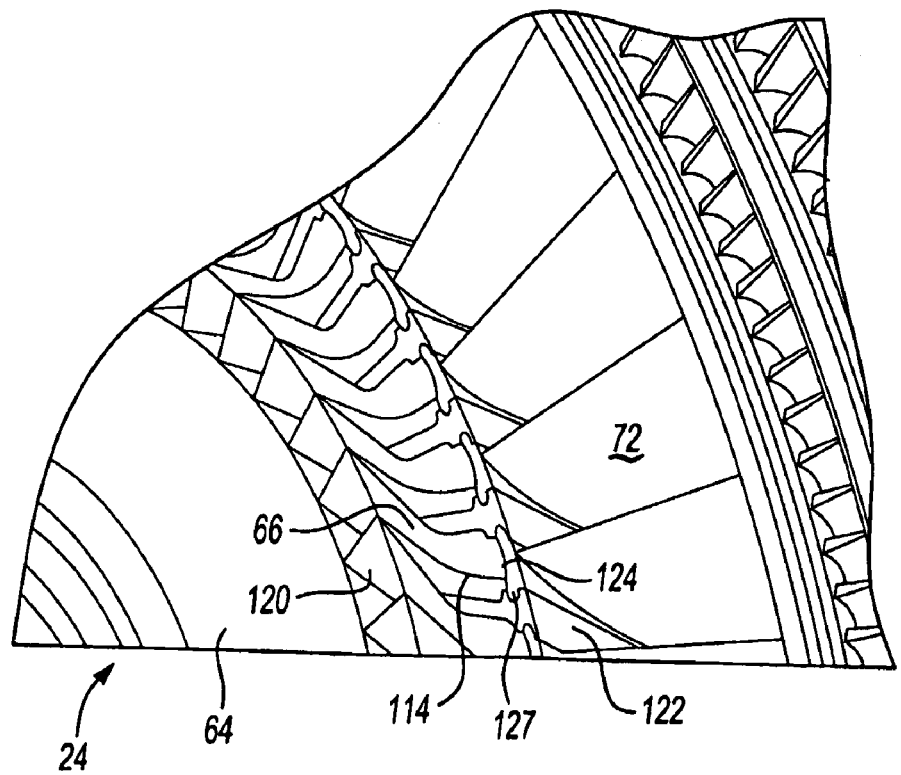
FIG. 6 is an expanded perspective view of the fan-turbine rotor assembly.

The inducer sections 66 together form an inducer 116 of the fan-turbine rotor assembly 24. The inducer inlet 120 of each inducer passage 118 extends forward of the fan hub 64 and is canted toward a rotational direction of the fan hub 64 such that inducer inlet 120 operates as an air scoop during rotation of the fan-turbine rotor assembly 24 (FIG. 6). Each inducer passage 118 provides separate airflow communication to each core airflow passage 80 when each fan blade section 72 is mounted within each elongated opening 114.

Inducer sections 66 are preferably uni-directionally assembled into the fan hub 64 from the front such that the forces exerted upon the fan-turbine rotor assembly 24 during operation correspond with further locking of the inducer sections 66 into the fan hub 64. Each inducer inlet 120 preferably at least partially overlaps the next inducer inlet 120 when assembled into the fan hub 64 (FIG. 4) through the overlapped orientation the inducer inlets 120 lock the inducer sections 66 into the fan hub 64. That is, operational forces maintain the inducer sections 66 within the fan hub 64 in an assembled condition rather than operating to disassemble the components. Alternatively, or in addition the inducer sections 66 may be mounted to the fan hub 64 through an attachment such as bonding, welding, rivets, threaded fasteners, and the like.

Referring to FIG. 6, the fan hub 64 retains each hollow fan blade section 72 within each elongated opening 114 through a blade receipt section 122. The blade receipt section 122 preferably forms an axial semi-cylindrical opening 125 (also illustrated in FIG. 7) formed along the axial length of the elongated openings 114. It should be understood that other retention structures will likewise be usable with the present invention.

Figure 7:
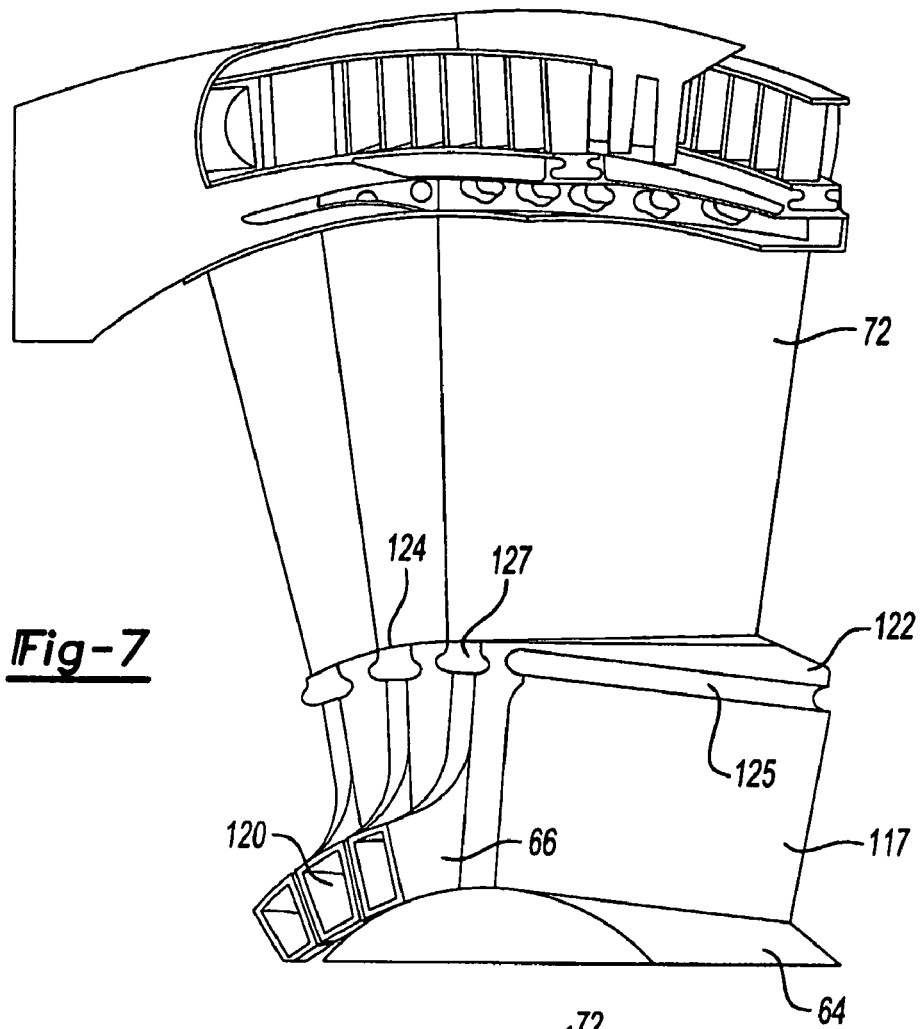
FIG. 7 is an expanded perspective view of a partially assembled fan-turbine rotor assembly.
Figure 8:
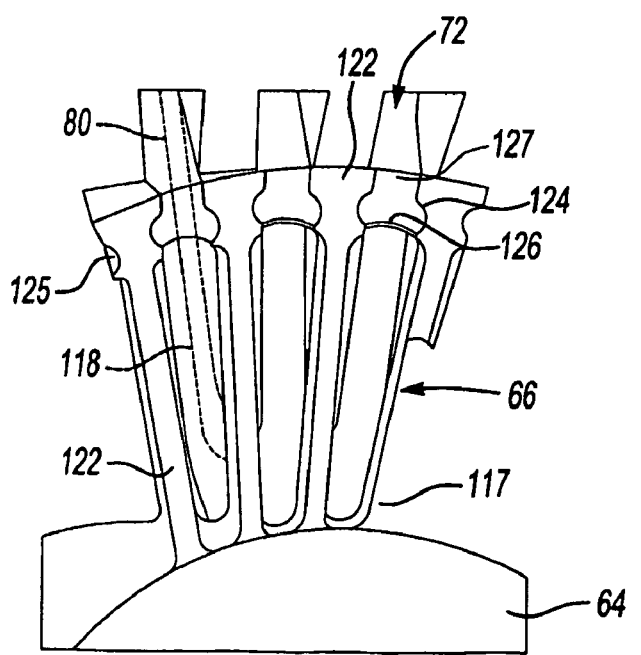
FIG. 8 is a tear sectional view of the engagement between an inducer receipt section, a blade receipt section, an inducer section and a fan blade section.

Referring to FIG. 7, each hollow fan blade section 72 includes an inner fan blade mount 124 that corresponds with the blade receipt section 122 to retain the hollow fan blade section 72 within the fan hub 64. The inner fan blade mount 124 preferably includes a semi-cylindrical portion 127 to radially retain the fan blade 28 through a dove-tail, fir-tree, or bulb-type engagement structure (FIG. 8). The fan hub 64 supports the hoop load required to retain the integrity of the disk/blade structure.

The inner fan blade mount 124 is preferably uni-directionally mounted into the blade receipt section 122 from the rear face of the fan hub 64. The inner fan blade mount 124 engages the blade receipt section 122 during operation of the fan-turbine rotor assembly 24 to provide a directional lock therebetween. That is, the inner fan blade mount 124 and the blade receipt section 122 may be frustoconical or axially non-symmetrical such that the forward segments 124a, 127a form a smaller engagement surface than the rear segment 124b, 127b to provide a wedged engagement therebetween when assembled.

Referring to FIG. 8, each inducer section 66 is further retained within the fan hub 64 by interaction with the inner fan blade mount 124. That is, the inner fan blade mount 124 engages the inducer exit 126 (FIG. 5) to further retain the inducer sections 66 into the fan hub 64 to provide core airflow communication through the inducer passages 118 and into the core airflow passage 80. Seals 128 may be additionally located between each inducer section 66 and each hollow fan blade section 72

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A fan assembly for a tip turbine engine comprising:
a fan hub defining an axis of rotation, said fan hub defining a multitude of elongated openings located about an outer periphery of said fan hub, each of said elongated openings extend to a fan hub web, define an inducer receipt section to receive an inducer section at least therein and a blade receipt section to retain a hollow fan blade section adjacent each of said inducer sections, said blade receipt section includes a dove tail engagement; and
an inducer mountable at least partially within said multitude of elongated openings to provide a directional lock therebetween, said inducer defining a multitude of inducer passages which turn an airflow from an axial airflow direction generally along said fan axis of rotation to a radial airflow direction.

2. The fan assembly as recited in claim 1, wherein said inducer includes a multitude of inducer sections each of which are independently receivable within one of said multitude of elongated openings.

3. The fan assembly as recited in claim 1, wherein each of said inducer sections defines an inducer passage inlet.

4. The fan assembly as recited in claim 3, wherein each of said inducer passage inlets communicates with each of said inducer passages defined by each of said inducer sections.

5. The fan assembly as recited in claim 4, wherein said inducer passage inlets are canted toward a rotational direction of said fan hub, each of said inducer sections at least partially overlapping an adjacent inducer section.

6. The fan assembly as recited in claim 1, further comprising a fan blade section having a tip turbine, each of said fan blade sections mounted within each of said elongated openings, each of said fan blade sections defining a fan blade core airflow passage to receive said airflow from a respective inducer passages therethrough.

7. A fan hub for a tip turbine engine comprising:
a fan hub defining an axis of rotation, said fan hub defining a multitude of elongated openings located about an outer periphery of said fan hub, each of said elongated openings extends to a fan hub web to define an inducer receipt section to receive an inducer section at least therein and a blade receipt section to retain a hollow fan blade section adjacent each of said inducer sections, wherein each of said elongated openings extends through a front face and an aft face of said fan hub to define a scalloped outer periphery.

8. A fan hub for a tip turbine engine comprising:
a fan hub defining an axis of rotation, said fan hub defining a multitude of elongated openings located about an outer periphery of said fan hub, each of said elongated openings extends to a fan hub web to define an inducer receipt section to receive an inducer section at least therein and a blade receipt section to retain a hollow fan blade section adjacent each of said inducer sections
wherein each of said elongated openings is non-parallel to said axis of rotation.

9. A method of assembling a fan assembly for a tip turbine engine comprising the steps of:
mounting an inducer section within each of a multitude of elongated openings formed in a fan hub from a front face of the fan hub, the fan hub defining an axis of rotation, the inducer defining a multitude of inducer passages which turn an airflow from an axial airflow direction generally along said fan axis of rotation to a radial airflow direction;
mounting a fan blade section within each of the multitude of elongated openings, each of the fan blade sections located adjacent and radially outboard of each of the inducer sections, each of said fan blade sections defining a fan blade core airflow passage to receive said airflow from a respective inducer passage therethrough; and
mounting a tip turbine about an outer periphery of each fan blade section.

10. A fan assembly for a tip turbine engine comprising:
a fan hub defining an axis of rotation, said fan hub defining a multitude of elongated openings located about an outer periphery of said fan hub, each of said elongated openings defines an axially non-symmetrical engagement surface to provide a wedged engagement between each of said multitude of elongated openings and a fan blade section; and
an inducer mountable at least partially within said multitude of elongated openings from a front face of the fan hub, said inducer defining a multitude of inducer passages which turn an airflow from an axial airflow direction generally along said fan axis of rotation to a radial airflow direction, each of said multitude of inducer passages defining an inducer passage inlet canted toward a rotational direction of said fan hub to engage an adjacent inducer passage inlet to provide a directional lock therebetween.

* * * * *